United States Patent [19]
Wiethorn

[11] Patent Number: 5,395,140
[45] Date of Patent: Mar. 7, 1995

[54] SECONDARY LATCH AND INDICATOR FOR FLUID COUPLING

[75] Inventor: Thomas Wiethorn, Rochester Hills, Mich.

[73] Assignee: Enhanced Applications, L.C., Lincoln Park, Mich.

[21] Appl. No.: 61,023

[22] Filed: May 13, 1993

[51] Int. Cl.⁶ ............................................. F16L 35/00
[52] U.S. Cl. ..................................... 285/93; 285/320; 285/921
[58] Field of Search ................ 285/311, 312, 320, 93, 285/921

[56] References Cited

U.S. PATENT DOCUMENTS

| | | | |
|---|---|---|---|
| 833,408 | 10/1906 | McCann | 285/320 X |
| 928,370 | 7/1909 | Feickert | 285/320 X |
| 964,238 | 7/1910 | Goss | 285/320 |
| 1,043,806 | 11/1912 | Duhl | 285/320 X |
| 2,281,633 | 5/1942 | Stitzer | 285/320 X |
| 3,278,205 | 10/1966 | Barlow | 285/311 |
| 4,068,870 | 1/1978 | Whitney | 285/320 |
| 4,423,892 | 1/1984 | Bartholomew . | |
| 4,925,217 | 5/1990 | Ketcham . | |
| 4,936,544 | 6/1990 | Bartholomew . | |
| 4,979,765 | 12/1990 | Bartholomew . | |
| 5,033,513 | 7/1991 | Bartholomew . | |
| 5,063,968 | 11/1991 | Bartholomew . | |
| 5,110,161 | 5/1992 | Bartholomew . | |
| 5,123,677 | 6/1992 | Kreczko et al. | 285/320 X |
| 5,152,555 | 10/1992 | Szabo . | |

*Primary Examiner*—Dave W. Arola
*Attorney, Agent, or Firm*—Harness, Dickey & Pierce

[57] ABSTRACT

A connector assembly for use with tubular conduits which mate with a housing having an axial bore for receiving one end of the conduit is disclosed and includes a coupling mechanism including a collar which is attachable over the housing and a pivotable stirrup which extends from the collar and engages an irregularity such as an annular projection or groove contained on the tubular conduit to retain the conduit within the housing. The coupling mechanism also provides a check mechanism for visually inspecting the connector assembly to insure that the tubular conduit has been fully connected to the housing.

33 Claims, 2 Drawing Sheets

SECONDARY LATCH AND INDICATOR FOR FLUID COUPLING

BACKGROUND OF THE INVENTION

The present invention relates to a connector assembly for fluid conveying conduits and, more particular, to a connector assembly including a coupling mechanism useful for confirming connection between the male conduit and female housing elements of the connector assembly.

In the automotive industry, as well as for many other industries, the need always exists for low cost, reliable, and easy to assemble components. This need is especially apparent with respect to providing a connection between fluid conveying conduits, such as fuel or refrigerant lines. Older threaded connectors typically require substantial assembly time for screwing on a cap to a fitting and tightening the cap down to the proper torque needed to provide a fluid tight seal. Further, an inventory would have to be maintained to keep track of the number of caps and fittings and any liners for other components that may be necessary. Also, re-tightening of the caps may be required to maintain the seal after the automobile or other system has been put into use.

Recently therefore there has been a move towards utilizing connector assemblies and particularly quick connector assemblies wherein a threaded connection is no longer needed to connect the male conduit and female housing elements. The quick connect assembly typically includes a female housing, a male conduit and some type of retainer for securing the male conduit within the female housing. One problem with many of the known quick connect assemblies is the failure to provide a check mechanism to insure that the male conduit is securely connected to the female housing. Further, for those connector assemblies including some type of check mechanism the mechanism is typically disposed within the female housing which precludes a visual inspection of the quick connector assembly to confirm a complete coupling between the male conduit and the female housing.

Accordingly, it is the primary object of the present invention to provide an improved connector assembly for providing a quick connection between fluid conveying conduits wherein the coupling mechanism serves to insure that a proper connection has been made between the tubular conduit and the housing.

In addition, it is any object of the present invention to provide a visual inspection device to periodically insure that the connection has been maintained.

Yet another object is to provide a secondary coupling between the tubular conduit and the housing.

Still another objection of the present invention is to provide an easily connectable assembly, which is inexpensive to manufacture, durable and may be employed to join dissimilar electrically conducted materials that would otherwise be subject to galvanic corrosion.

To achieve the foregoing objects, the present invention provides a connector assembly which generally comprises a tubular conduit, a housing, sealing means, retainer means and a coupling mechanism. The tubular conduit is adapted to convey fluid and is formed with a first annular projection disposed a predetermined distance from the end of the conduit to be connected. The housing is formed with an axial bore for receiving the conduit at a first end and for providing a fluid path at a second end. The housing includes a collar for receiving the coupling mechanism. The sealing means are disposed within the axial bore of the housing for providing a fluid tight seal between confronting portions of the conduit and housing. The retainer means is adapted to be disposed generally over the first end of the tubular conduit and extends partially within the axial bore of the housing. The retainer means includes at least one deformable leg having a blocking portion which seats against the first annular projection. The coupling mechanism includes a stirrup which is pivotally attached to the collar and can be rotated to engage the tubular conduit. The stirrup is provided with at least one projecting tab which snaps into a space provided on the collar to insure that connection between the tubular conduit and female housing is complete.

Under an alternative embodiment, the objects of the invention can be achieved by providing the tubular conduit with an irregularity in the form of either a second annular projection or an annular groove disposed a predetermined distance from the first annular projection. The annular projection or annular groove is engaged by a complimentary projection or groove contained on the pivotable stirrup.

BRIEF DESCRIPTION OF THE DRAWINGS

Additional objects and advantages of the present invention will become apparent from a reading of the detailed description of the preferred embodiments which makes reference to the following set of drawings in which.

DETAILED DESCRIPTION OF THE PREFERRED EMBODIMENT

Figure 1:
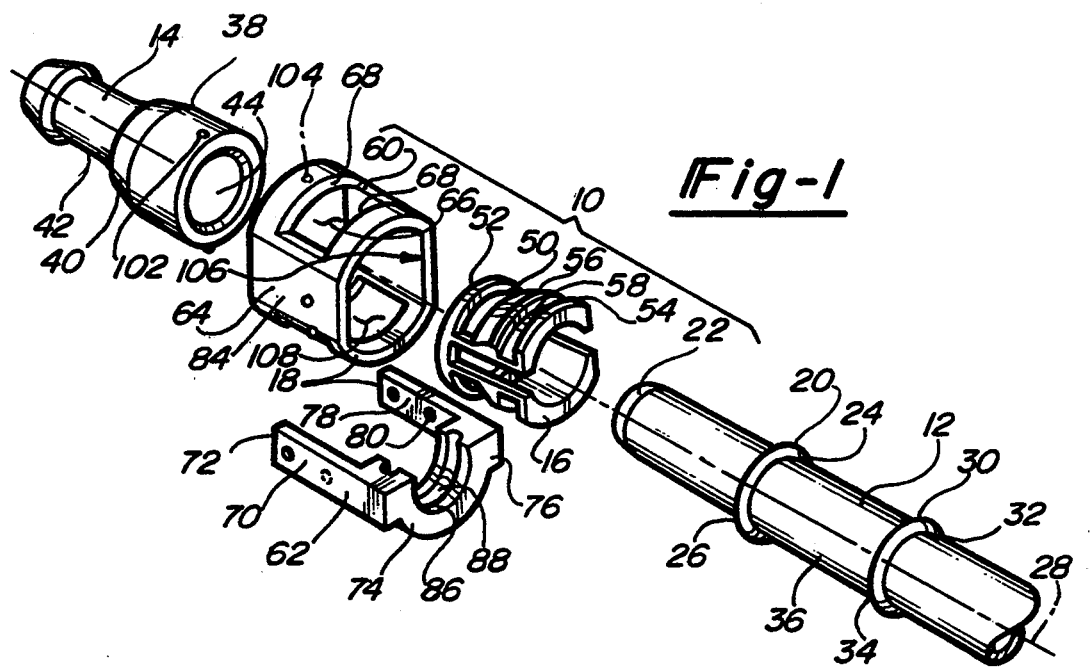
FIG. 1 is a blown out perspective view of one connector assembly embodiment according to the teachings of the present invention.

Referring to FIG. 1, a blown out perspective view of a connector assembly 10 according to the present invention is shown. The connector assembly is generally comprised of tubular conduit 12 adapted to convey fluid, a housing 14, a retainer element 16 and a coupling mechanism 18. Conduit 12 is provided with a first outwardly projecting annular portion 20 displaced from a beveled connecting end 22 of the conduit. The annular projection 22 is formed with first and second blocking wall portions 24 and 26, respectively, disposed substantially transversely or perpendicularly to the central axis 28 of the conduit. Located a predetermined distance from the first outwardly projecting annular portion 20 is a second outwardly projecting annular portion 30 which includes transversely disposed blocking wall portions 32 and 34, respectively.

The housing 14 includes an outer surface having a substantially round outer surface. The housing may include multiple sections, but typically includes an enlarged diameter portion 38, a reduced diameter portion 40, and a third diameter portion 42. Internally, the housing includes an axial bore 44 for receiving the sealing means and the first end of the conduit.

The retainer element 16 is made from a resilient material, such as metal or plastic, and is comprised of a pair of elongated legs 50 normally extending at an angle from opposite ends of a ring member 52. Each leg includes an outwardly projecting flange 54 disposed along the distal portion of the leg 50 and a tab portion 56 extending at approximately the center of each leg. Located between the tab portion and flange is a transverse groove 58.

The coupling mechanism 18 which is also made of a resilient material such as metal or plastic includes a substantially oval shaped collar 60 which fits over the enlarged diameter portion 38 of the housing 14 and a pivotable stirrup 62 attached to the collar along two substantially flat side walls 64 contained on the collar. The collar 60 also contains cut out top and bottom portions 66 having transverse blocking walls 68 for abutting engagement with the tab portions 56 of retainer member 16. The stirrup 62 comprises a pair of spaced apart legs 70 pivotally attached along a first end to the collar 60 and a transverse portion 74 which extends between the legs along a second end 76. As shown most clearly with reference to FIG. 2 and 3, the inner surface 78 of each leg 70 is provided with a detent 80 which mates with a boss 82 extending from the collar 60 to selectively maintain the stirrup 62 in a disengaged position to allow clearance for insertion of the conduit into the housing. Alternatively, the boss 82' can be provided on the inner surface 78' of one or both legs with the detents being included on the exterior surface 84 of the collar. The transverse portion 74 of the stirrup 62 includes a first arcuate shaped recessed portion 86 having a groove for receiving the second annular projection 30 of the tubular conduit 12.

Figure 2:
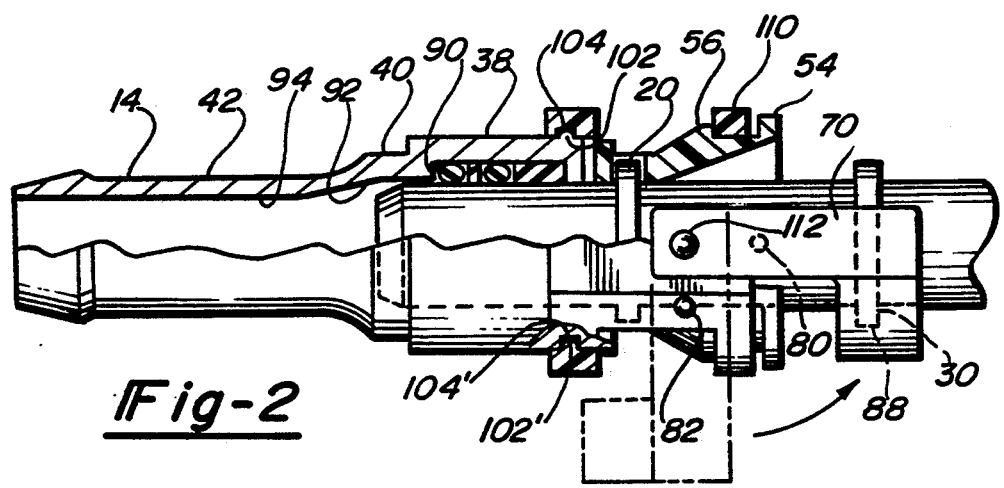
FIG. 2 is a side elevation view, partially in cross-section, of the connector assembly of FIG. 1.

Referring to FIG. 2 a side elevation view of the connector assembly 10 is shown, partially in cross-section and in the assembled position. Housing 14 is shown to be formed with a central bore 44, having an enlarged diameter portion 90, a reduced diameter portion 92, and a third diameter portion 94. Disposed within the third diameter portion of the housings central bore are the sealing means. The sealing means typically includes a first bushing 96 which separates a pair of elastomeric rings 98. A second bushing 100 is disposed within the second bushing 100 is used for spacing.

Figure 3:
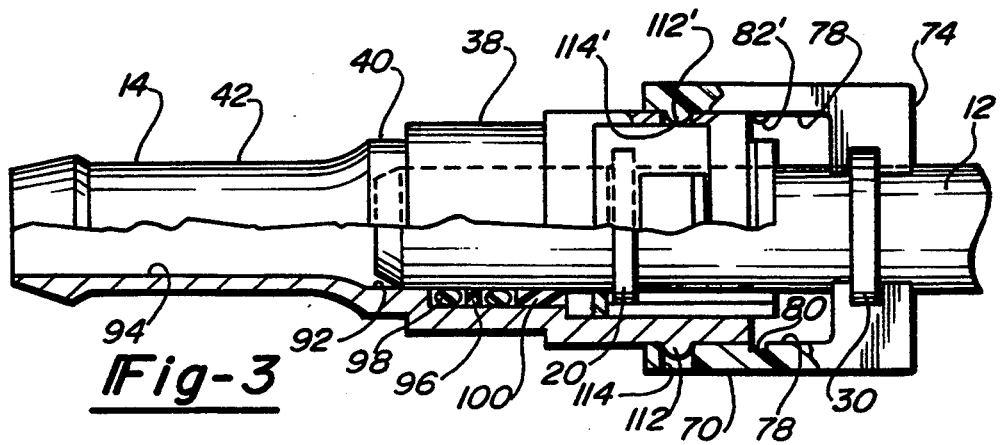
FIG. 3 is a top view of another connector assembly according to the teachings of the present invention.

The embodiment of FIG. 3 differs from the embodiment demonstrated by FIGS. 1 and 2 in that the collar 60' is formed as an integral part of the housing 14'. Depending the amount of force generated by the flow of fluid or other medium through the connector assembly it may be desirable to form the collar integrally during formation of the housing for each of the embodiments demonstrated.

Under the preferred embodiment of FIGS. 1 and 2, connector assembly 10 may be connected by first attaching the retainer element 16 to the tubular conduit 12 such that the first annular projection 20 snaps past the tab portions 56 and the legs 50 return to a normal position. The coupling mechanism 18 is then mounted onto the housing 14 such that the stirrup 62 is maintained in a disengaged downward position substantially perpendicular to the central axis 28 of the tubular conduit 12. The coupling mechanism 18 is secured to the housing 14 by positioning the collar 60 over the enlarged diameter portion 38 such that the post member 102 provided on the enlarged diameter portion 38 engages the notch 104 provided on the interior surface 106 of the collar. Alternatively, the post members 102' can be provided on the interior surface of the collar and the notches 104' can be provided on the enlarged diameter portion. As noted this step of mounting the coupling mechanism to the housing would not be required under the embodiment of FIG. 3.

The terminal first end 22 of the conduit 12 is then inserted into the central bore 44 through the axial aperture 108 of the collar 60 and advanced until the retainer element 16 is inserted into the leading end of the housing 14. The legs 50 of the retainer element 16 are compressed upon insertion of the retainer element until the tabs clear the transverse blocking wall 68 located along the trailing end 110 of the collar. Again, the legs 50 return to a normal position 56 such that the tab portions engage the transverse wall 68 and the flanges 54 lock in behind the trailing end 110 of the collar.

The stirrup 62 is then released from the disengaged position. The stirrup 62 is pivotally rotated about pivot pins 112 such that the transverse portion 74 of the stirrup advances toward the irregularity contained on the tubular conduit 12. It is important to note that the pivot pins 112 can extend from the exterior surface 84 of the collar 60 to engage apertures 114 contained on the inner surface 78 of the legs 70 or under an alternative embodiment the pivot pins 112' can extend from the inner surface 78 of the legs 70 to engage apertures 114' contained on the exterior surface 84 of the collar 60.

Figure 4:
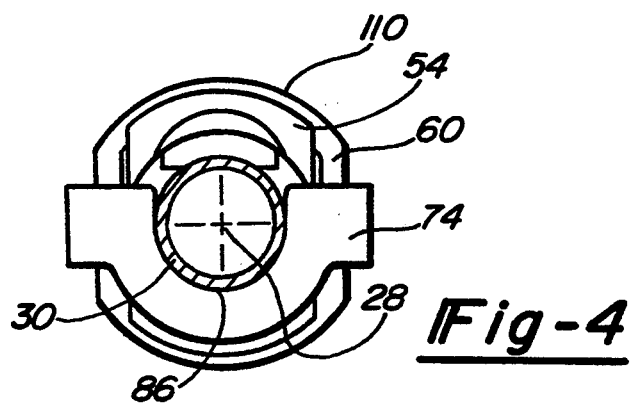
FIG. 4 is a perspective end view of the coupling mechanism shown in a latched position over the connector assembly.

With particular reference to the embodiment demonstrated in FIGS. 1 and 2 the stirrup 62 is pivotally rotated such that arcuate recess 86 contained on the transverse portion 74 of the stirrup engages the exterior surface 36 of the conduit 12. Additionally, the groove 88 contained on the arcuate recess 86 engages the second annular projection 30 contained on the tubular conduit 12 to further lock and secure the tubular conduit within the housing. The arcuate recess 86 and groove 88 of the transverse portion 74 extend beyond the centerline of the conduit to allow for an over center attachment of the stirrup 62 to the conduit as shown most clearly in FIG. 4. This over center attachment assists in maintaining the connection of the stirrup 62 to the tubular conduit 12.

Figure 5:
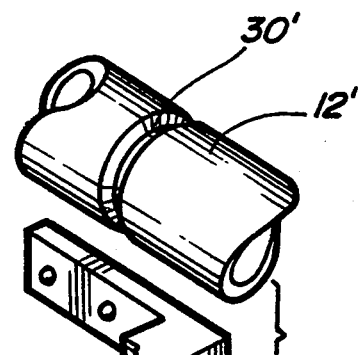
FIG. 5 is an exploded prospective view of an alternative embodiment of the connector assembly according to the teachings of the present invention.

Referring to FIG. 5, an alternative embodiment of the coupling mechanism 18 and tubular conduit 12 assembly is shown. According to this embodiment the stirrup 62' is provided with an arcuate recess 86' containing an arcuate projection 88' which engages an annular groove provided on the tubular conduit 12'. Under this embodiment instead of utilizing a tubular conduit having two spaced apart annular projections, the tubular conduit 12' includes one annular projection (not shown) located proximate to the terminal end of the conduit and an annular groove 30' spaced apart from the annular projection. Hereto, an over center connection between the stirrup and the tubular conduit is intended. It should be noted that the coupling mechanism 18' can either be selectively attachable as demonstrated in FIGS. 1 and 2 or integrally formed as part of the housing as demonstrated in FIG. 3.

Upon connecting the stirrup to the tubular conduit such that the annular projection or groove is engaged the coupling mechanism serves to verify that a complete connection between the tubular conduit and the housing has been accomplished.

Figure 6:
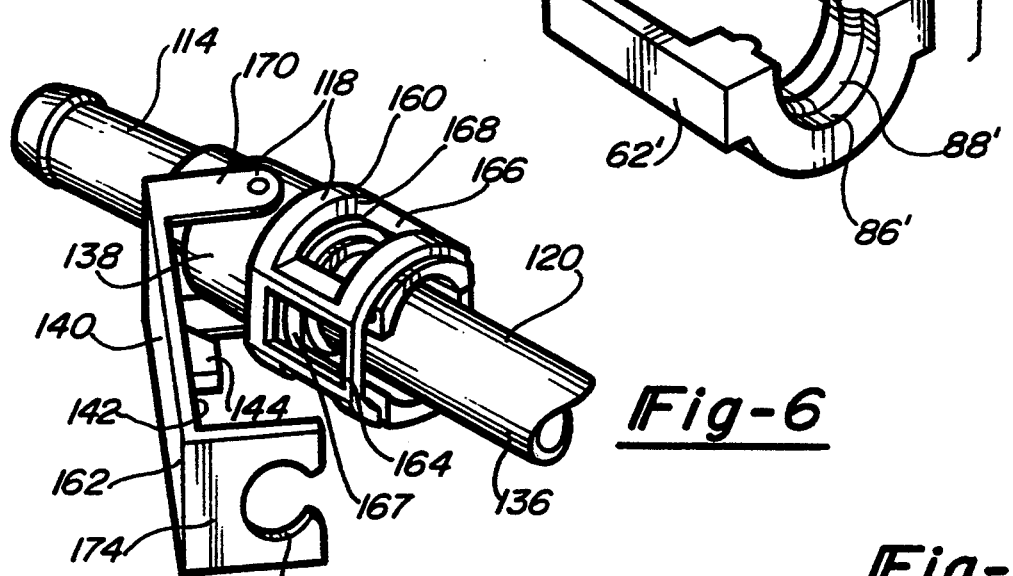
FIG. 6 is a perspective view of another connector assembly embodiment according to the teachings of the present invention.
Figure 7:
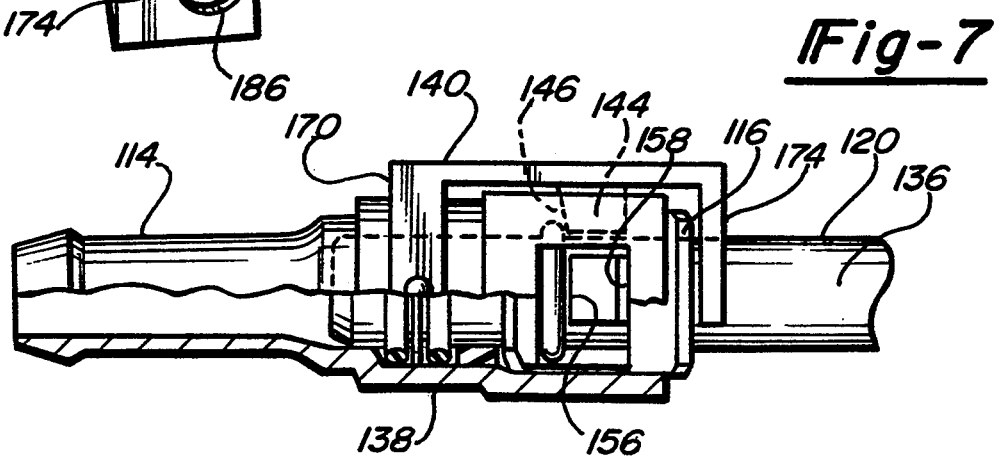
FIG. 7 is a side elevation view, partially in cross-section of the connector assembly of FIG. 6.

Referring to FIGS. 6 and 7 yet another embodiment of the present invention is demonstrated. The embodiment of FIGS. 6 and 7 is essentially the same as the previous embodiments with certain exceptions which will be described below. The coupling mechanism 118 is comprised of the collar 160 which preferably is formed integrally as a portion of the housing 114 and a stirrup 162 which is pivotally attached to the enlarged diameter portion 138 of the housing.

The collar 160 has a substantially oval shape and includes two substantially flat side walls 164 formed with spaces 167. The collar also includes cut out top and bottom portions 166 having blocking walls 168 for abutting engagement with the tab portions 156 of the retainer member 116. The stirrup 162 comprises a pair of spaced apart legs 170 pivotally attached to the enlarged diameter portion 138 of the housing 114 along one end and extending relatively perpendicularly from a body portion 140 along a second end. A transverse portion 174 extends relatively perpendicularly from the body portion 140 and relatively parallel to the legs 170. The transverse portion 174 includes an arcuate recess 186 designed to engage the exterior surface 136 of the tubular conduit 120. Located on the inner surface 142 of body portion 140 is an inwardly projecting tab 144. Upon connecting the tubular conduit 120 within the housing as described under the other embodiments and rotating the legs 170 to a position substantially perpendicular to the tubular conduit 120, the arcuate recess 186 engages the exterior surface 136 of the tubular conduit in an over center manner as previously described and the tab 144 extends through the space 167. Preferably the tab 144 extends sufficiently to locate itself abuttingly behind the annular projection 122 and the ring 152 of the retainer member 116. To assist in inserting the tab behind the annular projection 122 and ring 152 the abutting edge 146 of the tab 144 is tapered slightly inwardly in the direction of the transverse wall.

While the above detailed description constitutes the preferred embodiments of the present invention, it will be appreciated that the invention is susceptible to modifications, variations and change without departing from the proper scope and fair meaning of the accompanying claims.

What is claimed is:

1. A connector assembly, comprising:
   a conduit;
   a housing for receiving a portion of the conduit; and
   coupling means for connecting the conduit to the housing;
   said conduit being generally tubular shaped and including an exterior surface having an irregularity located at a predetermined distance from the terminal end of said conduit;
   said coupling means including a pivotable stirrup having two spaced apart legs extending from said coupling means and a transverse portion including an arcuate recess terminating in an opening of smaller dimension than the diameter of the conduit for engaging the irregularity contained on said conduit;
   whereby upon connecting said conduit within said housing and pivotally rotating the stirrup such that said arcuate recess extends beyond the centerline of the conduit to engage the irregularity on said conduit in an over center attachment, said conduit thereby becoming substantially locked within said housing.

2. The connector assembly according to claim 1, wherein said coupling means further comprise a collar integrally attached to the exterior surface of said housing, said collar further including means for attachably securing said coupling means to said housing, whereby said pivotable stirrup is pivotally attached to the exterior surface of said collar.

3. The connector assembly according to claim 2, wherein said irregularity contained on said conduit includes an arcuate recess.

4. The connector assembly according to claim 2, wherein said irregularity contained on said conduit includes an arcuate projection.

5. The connector assembly according to claim 2, wherein said means for attachably securing said coupling means to said housing comprise at least one post member extending from the interior surface of said collar and at least one notch contained the exterior surface of said housing for receiving the post member in a snap fit relationship.

6. The connector assembly according to claim 2, wherein said means for attachably securing said coupling means to said housing comprise at least one post member extending from the exterior surface of said housing and at least one notch contained on the interior surface of said collar for receiving the post member in a snap fit relationship.

7. The connector assembly according to claim 2, wherein said pivotally attached stirrup includes a pair of pivot pins extending from the interior surface of said legs, whereby each pin engages an aperture contained on the exterior surface of said collar.

8. The connector assembly according to claim 2, wherein said pivotally attached stirrup includes an aperture contained on the interior surface of each leg, whereby each aperture is engaged by a pivot pin contained on the exterior surface of said collar.

9. The connector assembly according to claim 2, wherein said coupling means include means for securing the stirrup in a disengaged position such that the tubular conduit can be inserted into said housing through said collar.

10. The connector assembly according to claim 9, wherein said means for securing the stirrup in a disengaged position comprise at least one boss extending from the exterior surface of said collar and detent means contained on the inner surface of at least one of said legs for receiving said boss in a snap fit relationship.

11. The connector assembly according to claim 9, wherein said means for securing the stirrup in a disengaged position comprise a boss extending from the inner surface of at least one of said legs and detent means contained on the exterior surface of said collar for receiving said boss in a snap fit relationship.

12. The connector assembly according to claim 2, further comprising sealing means including a sealing element of annular configuration disposed within said housing, said sealing element being in axial registry with the terminal end of said conduit and having an inner diameter sealingly engaged with the exterior surface thereof.

13. The connector assembly according to claim 12, further comprising a retainer element disposable within said collar for locking the terminal end of the conduit within the housing, said retainer element including an annular ring having at least one deformable leg extending rearwardly therefrom, said deformable leg including an radially extending tab portion and a radially extending flange separated by a channel.

14. The connector assembly according to claim 13, wherein said housing includes an axial bore adapted for receiving at least a portion of said conduit, said bore including a first portion adapted to receive the terminal end of said conduit, a second portion adapted for sealing engagement with the exterior surface of the sealing element and a third portion for receiving the annular ring of said retainer element.

15. A coupling assembly for use in connecting a housing and a tubular conduit, said tubular conduit having a first end disposed at least partially within said housing and a portion extending from said housing, said extending portion including an irregularity disposed a predetermined distance from said first end, said coupling mechanism comprising:
   an annular collar integrally attached to said housing, including an inside diameter having an axial aperture therethrough, an exterior surface and at least one slot extending through the exterior surface to the axial aperture; and
   stirrup means extending from said collar, said stirrup means including a pair of spaced apart legs pivotally attached to said collar and connected by a transverse portion, said transverse portion including an arcuate recess terminating in an opening of smaller dimension than the diameter of the conduit for engaging the irregularity contained on said tubular conduit in an over center attachment whereby the recess extends beyond the centerline of the conduit to operatively maintain the tubular conduit within the housing.

16. The coupling assembly according to claim 15, further comprising means for attachably securing said annular collar to said housing.

17. The coupling assembly according to claim 16, wherein said means for attachably securing said annular collar to said housing comprise at least one post member extending from the interior surface of said collar and at least one notch contained on the exterior surface of said housing for receiving the post member in a snap fit relationship.

18. The coupling assembly according to claim 16, wherein said means for attachably securing said annular collar to said housing comprise at least one post member extending from the exterior surface of said housing and at least one notch contained on the interior surface of said collar for receiving the post member in a snap fit relationship.

19. The coupling assembly according to claim 15, further comprising means for securing the stirrup in a disengaged position such that the tubular conduit can be inserted into the housing.

20. The coupling assembly according to claim 17, wherein said means for securing the stirrup in a disengaged position comprise at least one boss extending from the exterior surface of said collar and detent means contained on the inner surface of at least one of said legs for receiving said boss in a snap fit relationship.

21. The coupling assembly according to claim 19, wherein said means for securing the stirrup in a disengaged position comprise a boss extending from the inner surface of at least one of said legs and detent means contained on the exterior surface of said collar for receiving said boss in a snap fit relationship.

22. The coupling assembly according to claim 15, further comprising means for attaching said collar to said housing.

23. The coupling assembly according to claim 22, wherein said means for attaching said collar to said housing comprises at least one post member extending from the interior surface of said collar and at least one notch contained the exterior surface of said housing for receiving the post member in a snap fit relationship.

24. The coupling assembly according to claim 22, wherein said means for attaching said collar to said housing comprises at least one post member extending from the exterior surface of said housing and at least on notch contained on the interior surface of said collar for receiving the post member in a snap fit relationship.

25. The coupling assembly according to claim 15, wherein said pivotally attached stirrup includes axially aligned pivot pins extending from the inner surface of each of said legs, whereby each pin engages an aperture contained on the exterior surface of said collar.

26. The coupling assembly according to claim 15, wherein said pivotally attached stirrup includes an axially aligned aperture on the inner surface of each leg, whereby each aperture is engaged by a pivot pin contained on the exterior surface of said collar.

27. A connector assembly, comprising:
   a conduit, a housing for receiving a portion of the conduit, and coupling means for connecting the conduit to the housing;
   said conduit being generally tubular shaped and including an annular projection located a predetermined distance from the terminal end of said conduit;
   said coupling means including a pivotable stirrup said stirrup including a pair of spaced apart legs extending from a portion of the housing, a body portion extending from said legs and a transverse portion including an arcuate recess terminating in an opening of smaller dimension than the diameter of the conduit and which extends beyond the centerline of the conduit upon connection for engaging the exterior surface of said conduit in an over center attachment;
   whereby upon connecting said conduit within said housing and pivotally rotating the stirrup such that said recess operatively engages the exterior surface of the conduit and said annular projection, said conduit becomes substantially locked within said housing.

28. The connector assembly according to claim 27, wherein said coupling means further comprise a collar integrally attached to said housing, said collar further including at least one hollow space.

29. The connector assembly according to claim 28, wherein said body portion includes a tab which projects inwardly from an inner surface of said body portion, whereby upon pivotally rotating said stirrup the tab extends through the space contained on the collar to further secure said conduit within said housing.

30. The connector assembly according to claim 29, wherein said tab means abuttingly engage the annular projection contained on said conduit.

31. A coupling assembly for use in connecting a housing and a tubular conduit having a first end disposed at least partially within said housing including an annular projection and a portion extending from said housing, said coupling assembly comprising:

an annular collar integrally attached to said housing, including an inside diameter having an axial aperture therethrough and an exterior surface, at least one slot and at least one space; and stirrup means extending from said housing, said stirrup means including a pair of spaced apart legs pivotally attached to a portion of said housing along one end and to an extending body portion along a second end and a transverse wall spaced apart from said legs and extending from said body portion, said transverse wall including a recess which terminates in an opening of smaller dimension than the diameter of the conduit and which extends beyond the centerline of the conduit for engaging the exterior surface of said tubular conduit in an over center attachment to operatively engage said annular projection to maintain the tubular conduit within the housing.

32. The coupling assembly according to claim 31, further comprising tab means projecting from the inner surface of said body portion, said tab means extending through said at least one space contained on said collar to further secure said conduit within said housing upon the connection of said recess over the exterior of the conduit.

33. The coupling assembly according to claim 32, wherein said tab means abuttingly engage the annular projection contained on the conduit.

* * * * *

UNITED STATES PATENT AND TRADEMARK OFFICE
CERTIFICATE OF CORRECTION

PATENT NO. : 5,395,140
DATED : Mar. 7, 1995
INVENTOR(S) : Thomas Weithorn

It is certified that error appears in the above-indentified patent and that said Letters Patent is hereby corrected as shown below:

Col. 1, Line 49, "any" should --an--;

Col. 1, Line 54, "objection" should be --object--;

Col. 2, Line 42, "prospective" should be --perspective--;

Col. 3, Line 48, "housings" should be --housing's--;

Col. 3, Line 51, delete "is";

Col. 3, Line 56, after "Dependings" insert --on--;

Col. 4, Line 31, after "or" insert --,--;

Col. 4, Line 31-32, after "embodiment" insert --,--;

Col. 6, Line 21, Claim 5, after "contained" insert --on--;

Col. 7, Line 3, Claim 13, "an" should be --a--;

Col. 8, Line 8, Claim 23, after "contained" insert --on--; and

Col. 8, Line 13, Claim 24, "on" should be -- one--.

Signed and Sealed this

Eleventh Day of July, 1995

Attest:

BRUCE LEHMAN

Attesting Officer

Commissioner of Patents and Trademarks